United States Patent [19]

Kuwabara et al.

[11] Patent Number: 4,980,599
[45] Date of Patent: Dec. 25, 1990

[54] ULTRASONIC MOTOR

[75] Inventors: Yasuo Kuwabara, Nagoya, Japan; Takao Saeki, Farmington Hills, Mich.; Naofumi Fujie, Nagoya, Japan

[73] Assignee: Aisin Seiki Kabushiki Kaisha, Kariya, Japan

[21] Appl. No.: 478,484

[22] Filed: Feb. 12, 1990

[30] Foreign Application Priority Data

Feb. 15, 1989 [JP] Japan .................. 1-35753

[51] Int. Cl.$^5$ ............................ H01L 41/08
[52] U.S. Cl. ..................... 310/323; 310/328
[58] Field of Search ................. 310/323, 328

[56] References Cited

U.S. PATENT DOCUMENTS

| 4,495,432 | 1/1985 | Katsuma et al. | 310/328 |
| 4,587,452 | 5/1986 | Okumura et al. | 310/323 X |
| 4,763,148 | 8/1988 | Tsukimoto et al. | 310/328 X |

FOREIGN PATENT DOCUMENTS

| 0178988 | 10/1984 | Japan | 310/323 |
| 0224883 | 10/1986 | Japan | 310/323 |
| 0247775 | 10/1987 | Japan | 310/323 |
| 0011073 | 1/1988 | Japan | 310/323 |
| 63-73887 | 4/1988 | Japan | 310/323 |

Primary Examiner—Mark O. Budd
Attorney, Agent, or Firm—Burns, Doane, Swecker & Mathis

[57] ABSTRACT

An ultrasonic motor is provided with a moving member and a vibrating member which is in contact with the moving member so as to provide the drive input for the moving member. A piezoelectric vibrator is attached to one side of the vibrating member and the opposite side of the vibrating member has a plurality of circumferentially arranged projections. A top section of each projection contacts the moving member. The piezoelectric vibrator will generate a travelling wave on the vibrating member when a proper alternating current electrical power source is applied to the vibrating member. The vibrating member would then be oscillated in a tangential direction, a normal direction, and a radial direction. The oscillations along the tangential direction and the normal direction generate the travelling wave and only the oscillation along the tangential direction is related to the rotational speed of the moving member. The moving member will then rotate faster and provide a greater amount of output energy if the amplitude of the oscillation along the tangential direction is increased. A ratio is established between the width of the contact portion and the width of the vibrating member. When the ratio of the widths is established in a predetermined range, the efficiency of the ultrasonic motor is improved.

4 Claims, 4 Drawing Sheets

Fig. 3

| a (mm) | b (mm) | c (mm) | a/b | amplitude(l) along tangent direction(θ) (μm) | resonant frequency (f) (KHz) | output (fl) |
|---|---|---|---|---|---|---|
| 12 | 22 | 55 | 0.5454 | 7.7 | 28.6 | 220.22 |
| 10 | 22 | 55 | 0.4545 | 8.8 | 30.0 | 264.00 |
| 8 | 22 | 55 | 0.3636 | 10.5 | 31.5 | 330.75 |
| 6 | 22 | 55 | 0.2727 | 11.0 | 32.8 | 360.80 |
| 4 | 22 | 55 | 0.1818 | 10.7 | 33.6 | 359.52 |
| 2 | 22 | 55 | 0.0909 | 9.7 | 34.1 | 330.77 |

ULTRASONIC MOTOR

BACKGROUND OF THE INVENTION

1. Field of the Invention

This invention relates to an ultrasonic motor which utilizes a traveling wave for driving a moving member, and more particularly, relates to an improvement of a vibration member on which the traveling wave is generated.

2. Description of the Related Art

FIGS. 4 and 5 show a structure of a conventional ultrasonic motor. Further, FIG. 6 is a cross-section view of a vibrating member 6 which is installed in the conventional ultrasonic motor.

A ring-shaped vibrator 7 is adhered to the disc-shaped vibrating member 6. A moving member 2 is in contact with a contacting portion 6a of the vibrating member 6.

The vibrating member 6 is rigidly fixed, at its center, to a cover 11. The moving member 2 is pressed against the vibrating member 6 through a rubbery resilient member 4 by a spring 3. A spindle 1 is inserted into the center of the moving member 2 so as to support the moving member 2. The spindle 1 is rotatably supported by a pair of bearings 9a, 9b which are pressed into a case 10 and the cover 11.

When an A.C. electrical power source having a proper frequency and phase is applied to the vibrator 7, the vibrating member 6 is oscillated along a tangent direction $\Theta$, a normal direction z and radial direction r. The oscillations along the tangent direction $\Theta$ and the normal direction z generate a traveling wave which circulates along the contacting portion 6a of the vibrating member 6. The moving member 2 which is pressed to the vibrating member 6 rotates with the spindle 1 in accordance with circulation of the traveling wave.

In the conventional ultrasonic motor, the radial width a of the contacting portion 6a is smaller than the radial width b of the vibrating member 6 (i.e., width a$\leq$width b) so that energy of the vibration is concentrated to the contacting portion 6a. The output of the ultrasonic motor is increased if the energy of the vibration is concentrated to the contact portion 6a.

However, if the radial width a becomes too large compared with the radial width b, the amplitude along the tangent direction $\Theta$ is decreased. As a result of this, the moving member 2 rotates slowly and output of the ultrasonic motor is decreased.

SUMMARY OF THE INVENTION

Accordingly, one of the objects of this invention is to obviate the above-discussed conventional drawbacks.

It is also an object of this invention to increase the amplitude of the vibration of the ultrasonic motor along the tangent direction $\Theta$.

It is another object of this invention to increase output of the ultrasonic motor.

It is a further object of this invention to provide a proper relationship between the width a of the contacting portion of the vibrating member and the width b of the vibrating member.

To achieve the above objects and in accordance with the principles of the invention as embodied and broadly described herein, the ultrasonic motor may comprise a moving member and a vibrating member having a contacting portion in contact with the moving member, such that a ratio a/b between a width a of the contacting portion and a width b of the vibrating member is established in the range of $0.09 \leq a/b \leq 0.45$.

If the ratio a/b is established between 0.09 and 0.45, a predetermined stiffness of the vibrating member is established. Therefore, amplitude of the oscillation along the tangent direction $\theta$ can be increased.

More preferably, the ratio between widths a and b is established in the range of $0.09 \leq a/b \leq 0.36$. If the ratio a/b is established between 0.09 and 0.36, a resonant frequency of the vibrating member is increased and efficiency of the ultrasonic motor can be improved.

BRIEF DESCRIPTION OF THE DRAWINGS

The accompanying drawings illustrate an embodiment of the invention and serve to explain the principles of the invention. In the drawings:

FIG. 1b is a plane view of the vibrating member of FIG. 1a;

FIG. 3 is a table showing characteristics of a vibrating member according to this invention;

DETAILED DESCRIPTION OF A PREFERRED EMBODIMENT

Reference will now be made in detail to the present preferred embodiment of the invention, an example of which is illustrated in accompanying drawings.

Figure 4:
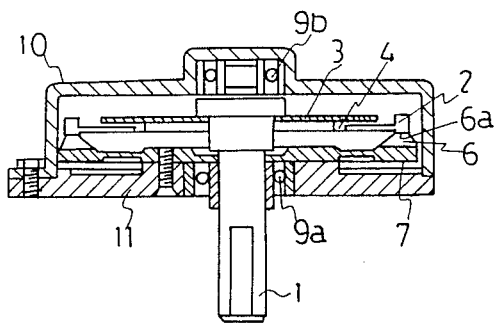
FIG. 4 is a cross-sectional view of a conventional ultrasonic motor.
Figure 5:
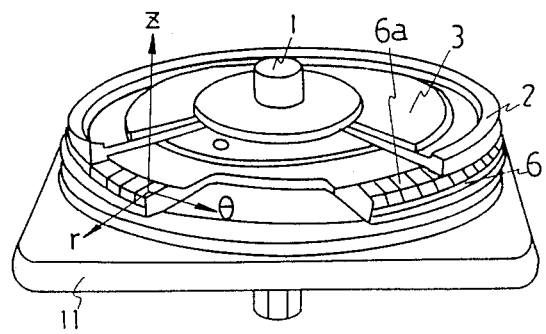
FIG. 5 is a perspective view of a conventional ultrasonic motor.
Figure 6:
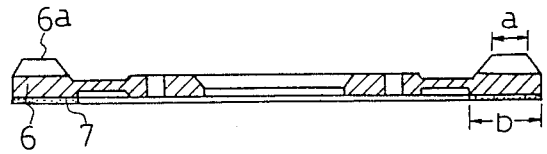
FIG. 6 is a cross-sectional view of a vibrating member relating to conventional ultrasonic motor.

Referring now to FIG. 1, an embodiment of this invention will be explained. The embodiment of this invention, except for the vibrating member 16, has the same construction as the ultrasonic motor of FIGS. 4 and 5. Accordingly, only the vibrating member 16 will be explained in detail.

Figure 1A:
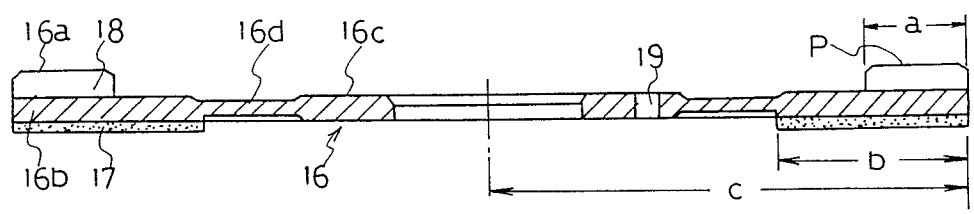
FIG. 1a is a cross-sectional view of a vibrating member according to this invention.
Figure 1B:
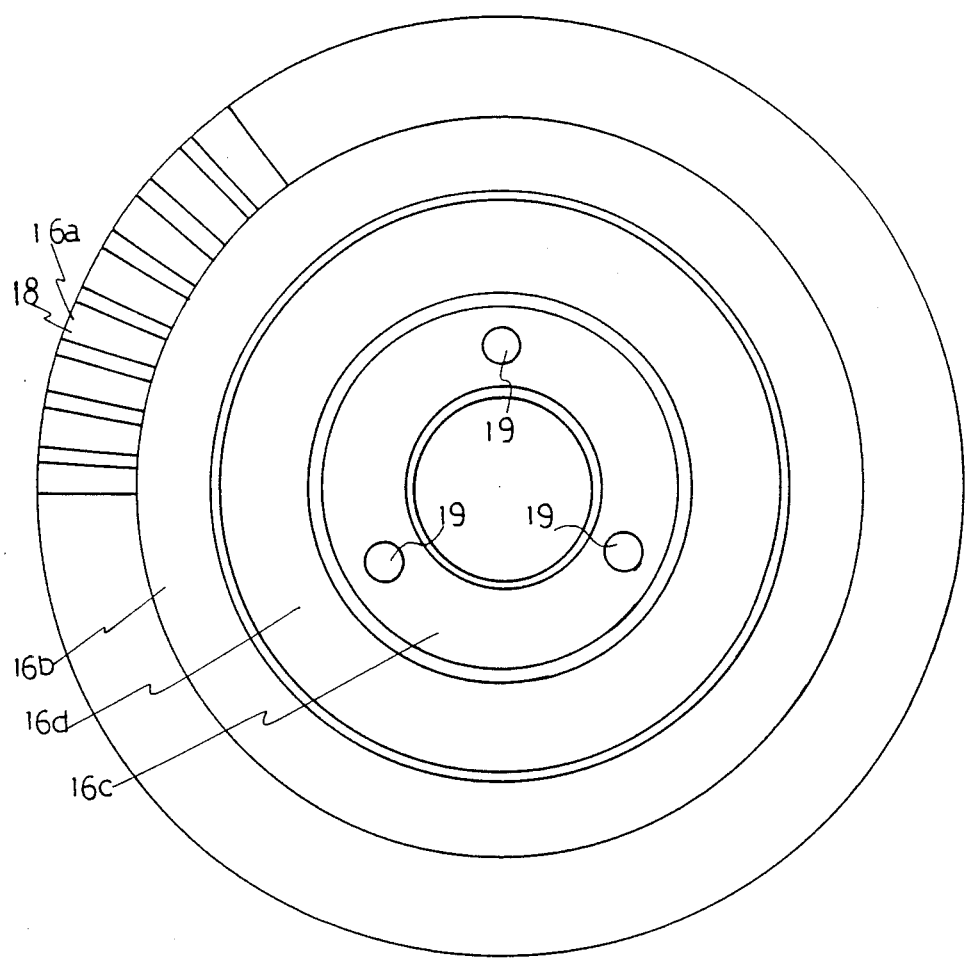

FIG. 1a is a cross-sectional view of a vibrating member 16 and FIG. 1b is a plane view of the vibrating member 16. The vibrating member is made from a phosphor-bronze material. The vibrating member 16 has an outer ring portion 16b, an inner ring portion 16c, and a thinner portion 16d. The outer portion 16b is integrally connected with the inner portion 16c and with the thinner portion 16d. A ring-shaped piezoelectric vibrator 17 is adhered by a conductive adhesive to one side of the outer ring portion 16b. On the opposite side of the outer ring portion 16b, a plurality of equally pitched projections 18 are formed integrally with the vibrating member 16. The top of each projection 18 is a contacting portion 16a which is in contact with the moving member 2.

The vibrating member 16 is fixed to the cover 11 by screws (not shown) which extend through holes 19.

The vibrator 17 is a known element provided to generate a traveling wave for the ultrasonic motor. Japanese Utility Model Laid Open Pat. Publication No. 59-66392 published on May 4, 1964, discloses a typical conventional vibrator. The vibrator 17 generates a traveling wave on the vibrating member 16 when the proper alternating current electric power of a proper frequency and phase is applied to the vibrator 17.

As described above, when the vibrator 17 is oscillating, the vibrating member 16 is oscillated in the tangent direction Θ, the normal direction z and the radial direction r. Among these oscillations, only the oscillations along the tangent direction Θ and the normal direction z are related to the generation of the traveling wave. Further, only the oscillation along tangent direction Θ is related to the rotational speed of the moving member 2. Therefore, the moving member 2 rotates faster and the output energy of the moving member 2 is increased, if the amplitude of the oscillation along tangent direction Θ is increased.

Figure 2:
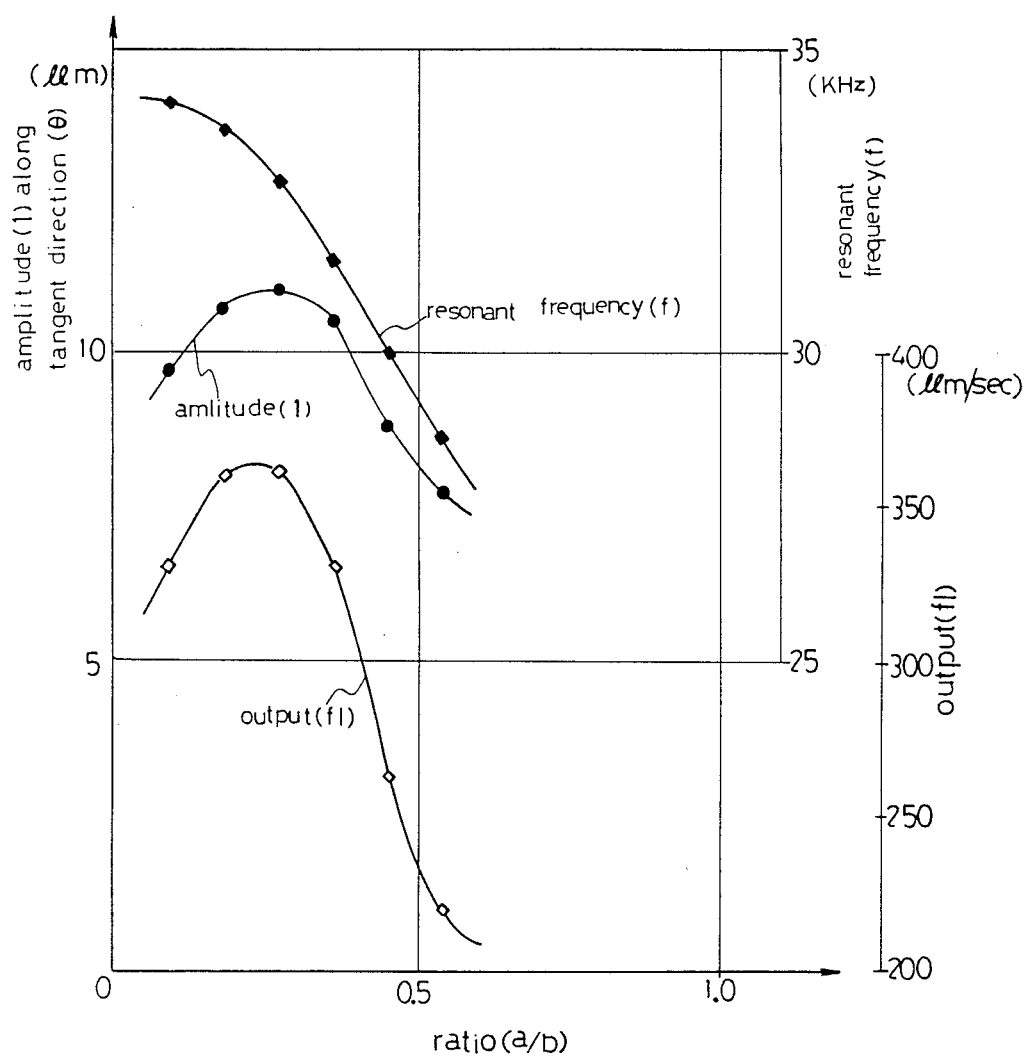
FIG. 2 is a graph showing characteristics of a vibrating member according to this invention.

The amplitude of the oscillation along tangent direction Θ is measured at a point P which is located substantially in the middle of the contact portion 16a under various ratios a/b. FIGS. 2 and 3 show the results of the measurements.

If the ratio a/b is greater than 0.45, the stiffness of the vibrating member 16 becomes too high and the amplitude along the tangent direction Θ is less than 8 μm.

If the ratio a/b is less than 0.09, the stiffness of the vibrating member 16 becomes too low and the amplitude along the radial direction r is increased. Thus, the amplitude along the tangent direction Θ is weakened and decreases to less than 8 μm.

If the ratio a/b is established between 0.09 and 0.45 (i.e., $0.09 \leq a/b \leq 0.45$), the stiffness of the vibrating member 16 is proper for establishing an efficient amplitude of oscillation. Therefore, the amplitude along tangent direction Θ becomes greater than 8 μm. Especially, if the ratio a/b is established at substantially 0.36, the amplitude along the tangent direction Θ can be preferably maximized.

The output P of the conventional motor is defined by the following formula:

$$\text{output (P)} = \text{torque (T)} \cdot \text{rotational speed (N)} \quad (1)$$

The torque (T) is determined by pressure applied by the spring 3 in the conventional ultrasonic motor. Therefore, the torque (T) can be regarded as a constant since the pressure of the spring 3 is constant. Thus, the output (P) can regard as a proportional value relating to the rotational speed (N) of the moving member 2. That is:

$$\text{output (P)} \alpha \text{ rotational speed (N)} \quad (2)$$

The rotational speed (N) is defined as formula (3) by the amplitude 1 of oscillation along tangent direction θ, a resonant frequency of the vibrating member 16, radius of vibrating member 16 and constant value (m).

$$\text{speed }(N) = \text{constant }(m) \cdot \frac{\text{resonant freq. }(f) \cdot \text{amplitude }(l)}{2\pi \cdot \text{radius }(R)} \quad (3)$$

The radius (R) of the vibrating member 16 can regard as a constant value. Therefore, the rotational speed (N) can be defined by formula (4) by the resonant frequency (f), the amplitude (1) and a constant value (n).

$$\text{speed (N)} = \text{constant (n)} \cdot \text{frequency (f)} \cdot \text{amplitude(1)} \quad (4)$$

As can be understood from formula (2) and (4), the output (P) is proportional to the product of the resonant frequency (f) and the amplitude (1), i.e., $$\text{output (F)} \alpha \text{ resonant frequency (f)} \times \text{amplitude (1)} \quad (5)$$

FIG. 3 is a table which shows the products of resonant frequency (f) and amplitude (1) under various ratios a/b and FIG. 2 is a graph which shows characteristics of the output (P).

If the ratio (a/b) is increased to more than 0.36, or if the ratio (a/b) becomes less than 0.09, the product of the resonant frequency (f) and the amplitude (1) becomes less than 330 (μm/sec). Thus, the vibrator 17 generates a large amount of heat due to a decrease in the efficiency.

If the ratio a/b is established between 0.09 and 0.36 (i.e., $0.09 \leq a/b \leq 0.36$), the output from the moving member 2 is increased because the product of the resonant frequency (f) and the amplitude (1) becomes greater than 330 (μm/sec). Under these operating conditions, the efficiency of the ultrasonic motor is improved and the vibrator 17 does not generate as much heat. Especially, if the ratio a/b is established between 0.18 and 0.27 (i.e., $0.18 \leq a/b \leq 0.27$), the output (P) of the moving member 2 can be preferably maximized.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. An ultrasonic motor comprising:
a moving member; and,
a vibrating member provided with a contact portion which contacts the moving member,
wherein a ratio a/b between a width a of the contact portion and a width b of the vibrating member is established in the range of $0.09 \leq a/b \leq 0.45$.

2. The apparatus in claim 1 wherein the vibrating member is provided with a plurality of circumferentially arranged projections and the contact portion is defined on a top side of the projections.

3. The apparatus in claim 1 wherein the ratio a/b is established in the range of $0.09 \leq a/b \leq 0.36$.

4. The apparatus in claim 3 wherein the vibrating member is provided with a plurality of circumferentially arranged projections and the contact portion is defined on a top side of the projections.

* * * * *